US007913627B2

(12) United States Patent
Shimizu et al.

(10) Patent No.: US 7,913,627 B2
(45) Date of Patent: Mar. 29, 2011

(54) UPPER AND LOWER PATH SWITCHING DEVICE FOR TRAVELING BODY FOR TRANSPORTATION

(75) Inventors: Yoshio Shimizu, Shiga (JP); Teruaki Nabeta, Shiga (JP)

(73) Assignee: Daifuku Co. Ltd. (JP)

( * ) Notice: Subject to any disclaimer, the term of this patent is extended or adjusted under 35 U.S.C. 154(b) by 559 days.

(21) Appl. No.: 12/016,420

(22) Filed: Jan. 18, 2008

(65) Prior Publication Data
US 2008/0173500 A1    Jul. 24, 2008

(30) Foreign Application Priority Data

Jan. 22, 2007 (JP) ................................ 2007-011062

(51) Int. Cl.
*B61B 1/00* (2006.01)
(52) U.S. Cl. .......................... 104/128; 104/129; 187/216
(58) Field of Classification Search .................. 104/127, 104/128, 129, 130.01–130.04; 187/210, 187/216, 250, 267, 284, 400; 238/281, 283
See application file for complete search history.

(56) References Cited

U.S. PATENT DOCUMENTS

| 1,192,300 | A | * | 7/1916 | Gottlieb | 238/31 |
| 4,094,252 | A | * | 6/1978 | Pater et al. | 104/130.01 |
| 4,706,782 | A | * | 11/1987 | Spoeler et al. | 187/403 |
| 5,085,019 | A | * | 2/1992 | van Herpen | 52/127.1 |
| 5,110,046 | A | * | 5/1992 | Young | 238/283 |
| 5,238,348 | A | * | 8/1993 | Reimer | 414/254 |
| 5,628,583 | A | * | 5/1997 | Gibson | 405/3 |
| 7,584,704 | B2 | * | 9/2009 | Schutte et al. | 104/129 |

FOREIGN PATENT DOCUMENTS

JP             04-350017           12/1992

* cited by examiner

*Primary Examiner* — S. Joseph Morano
*Assistant Examiner* — Zachary Kuhfuss
(74) *Attorney, Agent, or Firm* — St. Onge Steward Johnston & Reens LLC

(57) ABSTRACT

An upper and lower path switching device for a traveling body for transportation has an elevating guide rail supported horizontally by an elevating body, upper fixed guide rails which are connected to the elevating guide rail at a lifted position of the elevating body, and lower fixed guide rails which are connected to the elevating guide rail at a lowered position of the elevating body. The elevating guide rail is supported movably vertically in a predetermined range with respect to the elevating body. Receiving members are provided for receiving the elevating guide rail at a level at which the elevating guide rail is connected to the lower fixed guide rails before the elevating body reaches a lower limit of an elevation path of the elevating body.

5 Claims, 6 Drawing Sheets

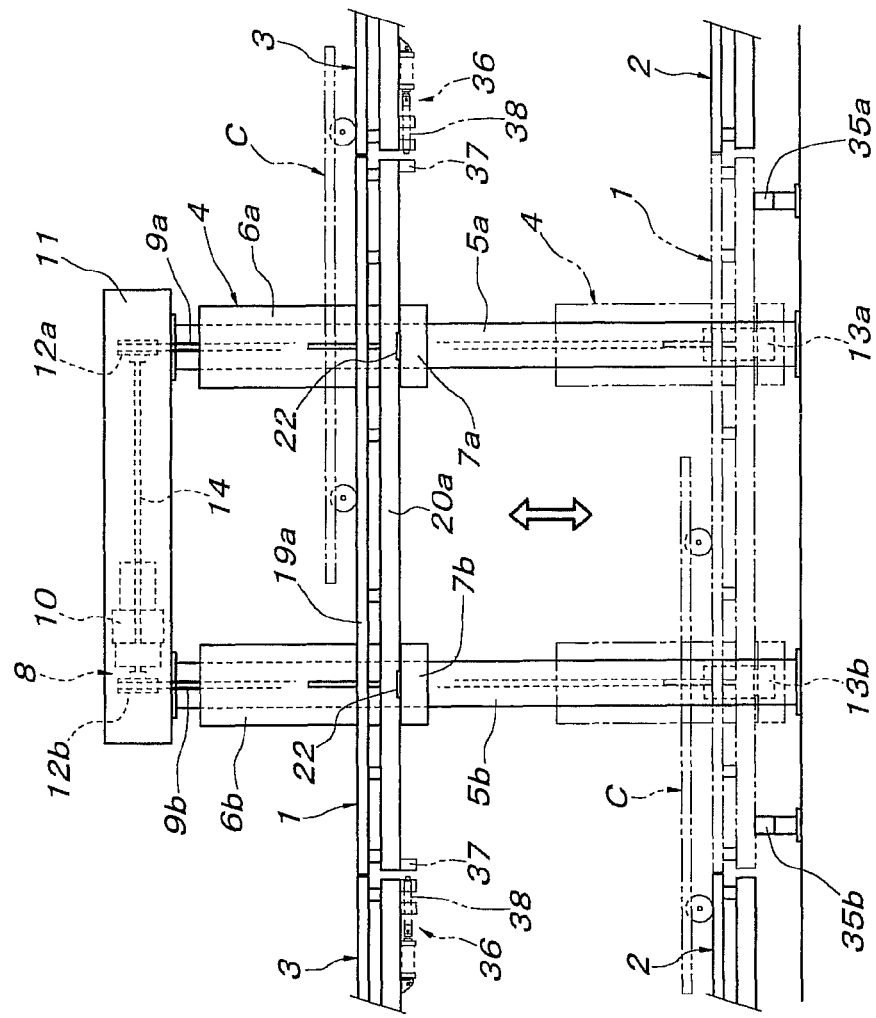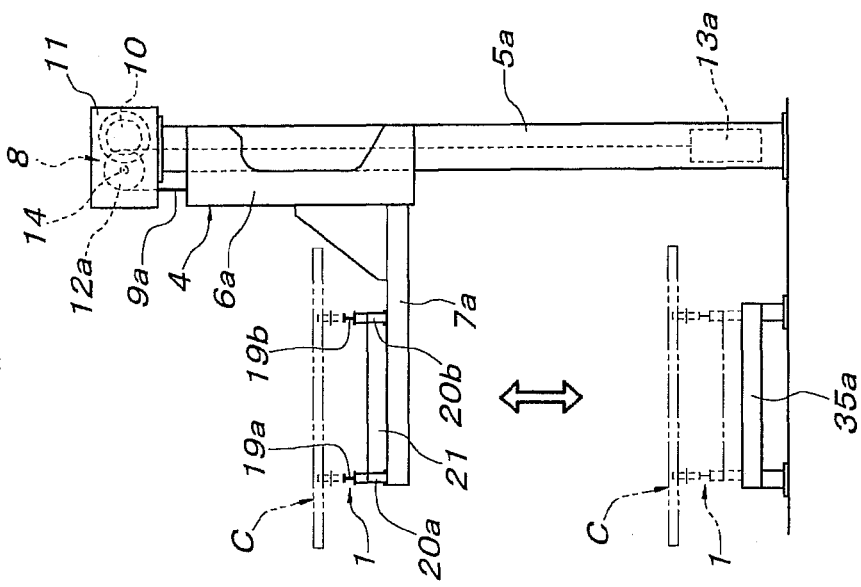

UPPER AND LOWER PATH SWITCHING DEVICE FOR TRAVELING BODY FOR TRANSPORTATION

FIELD OF THE INVENTION

The present invention relates to an upper and lower path switching device which transfers a traveling body for transportation such as a conveyance carriage from either an upper fixed guide rail or a lower fixed guide rail onto the other via an elevating guide rail.

BACKGROUND OF THE INVENTION

An upper and lower path switching device for a traveling body for transportation is described in Japanese Published Unexamined Patent Application No. H04-350017 (hereinafter, referred to as a known document), however, to safely and smoothly transfer the traveling body for transportation between the elevating guide rail and upper and lower fixed guide rails, it is necessary to accurately stop the elevating guide rail that moves vertically at a position at which the elevating guide rail is connected to the upper or lower fixed guide rail at the same level. In other words, high accuracy is required for a control system for an elevating drive means of an elevating body supporting the elevating guide rail. In actuality, in an upper and lower path switching device for a conveyance carriage which conveys a heavy load such as an automobile body, the elevating control target including the elevating body and the elevating guide rail is large in size and heavy in weight, so that a positioning means for the elevating guide rail as described in the known document is simultaneously used.

Thus, as a means for positioning the elevating guide rail in the conventional upper and lower path switching device for a traveling body for transportation as described in the known document, in particular, means for positioning the elevating guide rail at a level at which it is connected to the lower fixed guide rails, a receiving member for receiving the entire elevating control target including the elevating body and the elevating guide rail at a level at which the elevating guide rail is connected to the lower fixed guide rail is provided. In this conventional constitution, not only is the receiving member required to have great load bearing, the elevating drive means which elevates the elevating body operates even after received by the receiving member although this operating time is short, so that, for example, in the case of a suspending chain type elevating drive means which is frequently used in such a type of device, a suspending chain loosens after the elevating body is received by the receiving member, and therefore, a measure for preventing the suspending chain from coming off a guide wheel or the like must also be taken, and as a result, the facility cost increases as a whole.

SUMMARY OF THE INVENTION

An object of the present invention is to provide an upper and lower path switching device for a traveling body for transportation which can solve the above-described conventional problem, and an upper and lower path switching device for a traveling body for transportation as described in a first aspect includes, shown with the reference numerals in an embodiment described later, an elevating body 4 supported movably vertically on columnar supports 5a and 5b; a drive means 8 which drives and elevates the elevating body 4; an elevating guide rail 1 supported horizontally on the elevating body 4; upper fixed guide rails 3 which are connected to the elevating guide rail 1 at a lifted position of the elevating body 4; lower fixed guide rails 2 which are connected to the elevating guide rail 1 at a lowered position of the elevating body 4, and can transfer a traveling body for transportation C from either one of the upper fixed guide rail 3 or the lower fixed guide rail 2 onto the other via the elevating guide rail 1, wherein the elevating guide rail 1 is supported movably vertically in a predetermined range with respect to the elevating body 4, and receiving members 35a and 35b are provided which receive the elevating guide rail 1 at a level at which it is connected to the lower fixed guide rails 2 before the elevating body 4 reaches the lower limit.

According to the upper and lower path switching device for a traveling body for transportation of the present invention as described in the first aspect, by only controlling and stopping the elevating body being lowered so that a lowering distance of the elevating body from a position at which the elevating guide rail is received by the receiving members to the lower limit position becomes smaller than a vertical movement allowable range of the elevating guide rail with respect to the elevating body, the elevating guide rail can be securely stopped at a level at which it is connected to the lower fixed guide rails. In other words, although high accuracy is not required for stop control of the elevating body being lowered at the lower limit, the elevating body can be accurately stopped at the level at which it is connected to the lower fixed guide rails by the elevating guide rail, and the traveling body for transportation can be safely and smoothly transferred between these rails. In addition, the object to be received by the receiving members is only the elevating guide rail supported by the elevating body, so that in comparison with the conventional constitution in which the entirety including the elevating body and the elevating guide rail supported on the elevating body are received, the load bearing of the receiving members themselves can be lowered, and even in the case of a suspending chain type elevating drive means of the elevating body, the suspending chain does not loosen after the elevating body lowers to the lower limit position, and a measure for preventing a suspending chain loosened from coming off the guide wheel is not necessary, so that increased safety and low cost are realized.

When carrying out the present invention constituted as described above, in detail, as described in a second aspect, it is possible that the elevating body 4 is provided with elevating main bodies 6a and 6b supported movably vertically on columnar supports 5a and 5b and horizontal arms 7a and 7b projecting sideways horizontally from the elevating main bodies 6a and 6b, the elevating guide rail 1 is provided with a contact plate 25 projecting horizontally at a position to be placed on the horizontal arm 7a or 7b, and on the horizontal arm 7a or 7b, a horizontal support surface 24a which supports the contact plate 25 and holding members 26a and 26b which are covered on the contact plate 25 so as to restrict a horizontal position of the contact plate 25 and allow only vertical movements thereof in a predetermined range, can be provided.

With this constitution described in the second aspect, in comparison with the constitution in which vertical rail-like guides are provided on the elevating body side and engagement portions of the elevating guide rail are engaged movably vertically with the rail-like guides, the support structure of the elevating guide rail on the elevating body is simple, and assembly is easy. The present invention can also be carried out so that in the contact plate on the elevating guide rail side, vertical through holes (or notches) are made, and on the elevating body side (horizontal arms), vertical pin-like members to be inserted through the through holes (or notches) are provided in a projecting state, however, in comparison with this constitution, the holding members on the elevating body side are covered on the contact plate on the elevating guide rail side and protect this contact plate, so that the strength of the entire vertical positioning means of the elevating guide rail at the position at which it is connected to the lower fixed guide rails can also be increased.

When carrying out the constitution of the second aspect, in detail, as described in a third aspect, it is possible that the contact plate 25 is provided so as to project to both sides on the bottom surface of a rail support member 20a or 20b supporting a rail main body 19a or 19b of the elevating guide rail 1, and both projecting plate portions 25a and 25b are formed into convex shapes having projections 30 projecting horizontally at the centers thereof, and the holding members 26a and 26b include four seat portions 32a and 32b which fit recessed corners 31 on both sides of the projections 30 of both convex projecting plate portions 25a and 25b and restrict the horizontal position of the contact plate 25, and top plates 33 laid between the two seat portions 32a and 32b so as to cover both convex projecting plate portions 25a and 25b at a distance D above the plate portions. Further, as described in a fourth aspect, the horizontal support surface 24a on the side of the horizontal arm 7a or 7b on which the contact plate 25 is supported is formed by the upper surface of a slide plate 24 attached onto the horizontal arm 7a or 7b so as to be adjustable in position in a lateral direction orthogonal to the rail longitudinal direction of the elevating guide rail 1, and onto this slide plate 24, the holding members 26a and 26b can be attached.

According to the constitution described in the third aspect, in comparison with the constitution including side plates surrounding four corners of the contact plate in a rectangular shape in a plan view and top plates which restrict the upward movement allowable range of the elevating guide rail, the positioning strength in the horizontal direction of the elevating guide rail can be increased while the plane area of the entire vertical positioning means of the elevating guide rail at the position at which it is connected to the lower fixed guide rails is reduced. Further, according to the constitution described in the fourth aspect, by using the vertical positioning means of the elevating guide rail at the position at which it is connected to the lower fixed guide rails, position adjusting means in the left and right direction of the elevating guide rail at the position at which it is connected to the lower fixed guide rails can be constituted.

In the present invention, the means for positioning the elevating guide rail 1 at the level at which it is connected to the upper fixed guide rails 3 is not specified, so that, for example, as described in the known document, although a method in which the elevating body 4 is butted against and stopped by an upper limit stopper facing downward may be used, as the positioning means 36 for positioning the elevating guide rail 1 at the level at which it is connected to the upper fixed guide rails 3 by pushing-up the elevating guide rail 1 after the elevating body 4 reaches the upper limit, positioning means can be employed including a receiving portion 37 provided on the elevating guide rail 1 side and an advancing and withdrawing pin 38 which is provided on the upper fixed guide rail 3 side and can fit the receiving portion 37 in a horizontally disengageable manner, where the advancing and withdrawing pin 38 is formed into a square shaft having a tapered tip end, and the receiving portion 37 is provided with a pair of upper and lower horizontal rollers 41a and 41b which roll in contact with at least the upper and lower surfaces of the advancing and withdrawing pin 38.

BRIEF DESCRIPTION OF THE DRAWINGS

For a complete understanding of the above and other features of the invention, reference shall be made to the following detailed description of the preferred embodiments of the invention and to the accompanying drawings, wherein:

FIG. 1A is a schematic side view showing the entire device; and FIG. 1B is a schematic front view of the same;

PREFERRED EMBODIMENT OF THE INVENTION

Figure 2:
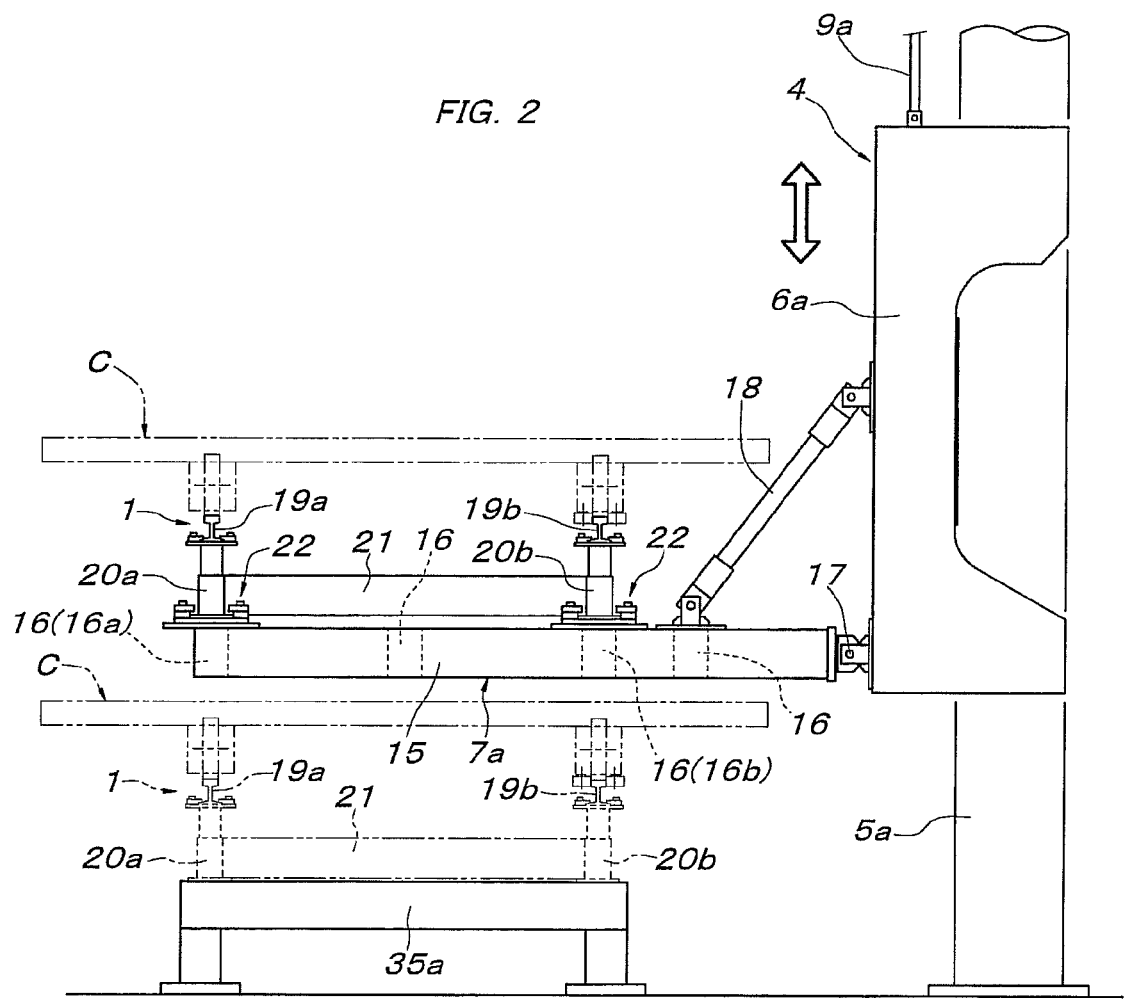
FIG. 2 is an enlarged side view of a main portion showing a state that the elevating guide rail is lowered just before the lowered position.

Hereinafter, a detailed embodiment of the present invention will be described with reference to the accompanying drawings. In FIG. 1, the reference numeral 1 denotes an elevating guide rail, 2 denotes lower fixed guide rails laid on a floor on the both front and rear sides of a position near the lower end of an elevating path of the elevating guide rail 1, and 3 denotes upper fixed guide rails laid on the both front and rear sides of a position near the upper end of the elevating path of the elevating guide rail 1. The reference numeral 4 denotes an elevating body which elevates while supporting the elevating guide rail 1, and includes a pair of elevating main bodies 6a and 6b which elevate along a pair of columnar supports 5a and 5b stood parallel on one side of the elevating path of the elevating guide rail 1, and a pair of horizontal arms 7a and 7b extending below the elevating guide rail 1 from the pair of elevating main bodies 6a and 6b, and the elevating guide rail 1 is supported horizontally on the pair of horizontal arms 7a and 7b.

The reference numeral 8 denotes an elevating drive means for the elevating body 4, includes a pair of suspending chains 9a and 9b and a driving motor 10, and the pair of suspending chains 9a and 9b are laid in a pulley-wound manner around guide wheels 12a and 12b axially supported on an upper joining frame 11 laid across the upper ends of the columnar supports 5a and 5b, and one ends of the chains are joined to the elevating main bodies 6a and 6b, and the other ends are joined to counter weights 13a and 13b freely fit into the columnar supports 5a and 5b movably vertically. The driving motor 10 is installed in the upper joining frame 11 and drives and rotates forward and reverse a transmission shaft 14 which interlocks and joins the guide wheels 12a and 12b to each other, and has appropriate reduction gear mechanism and braking means.

Figure 3:
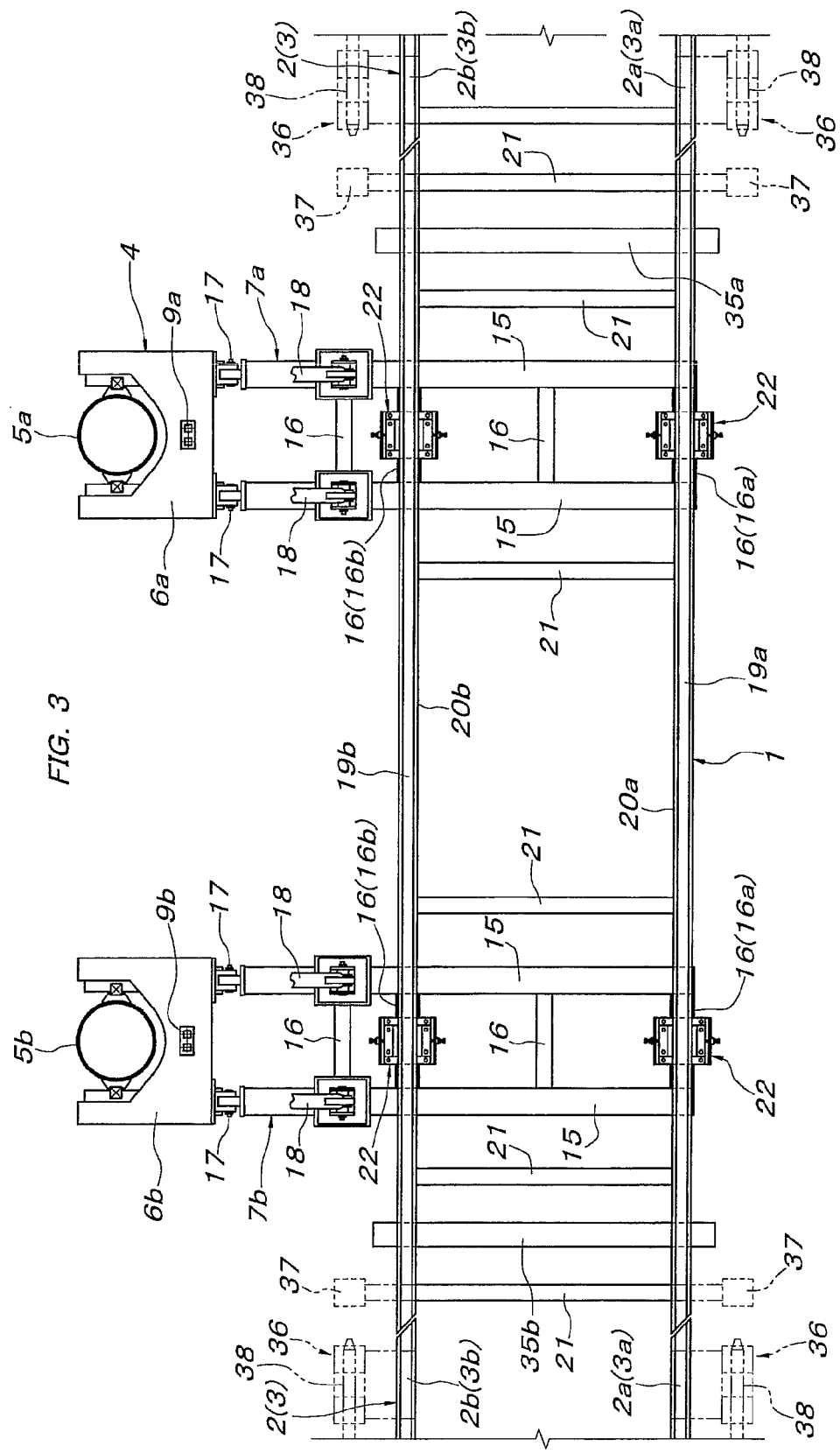
FIG. 3 is an enlarged cross-sectional plan view.
Figure 4:
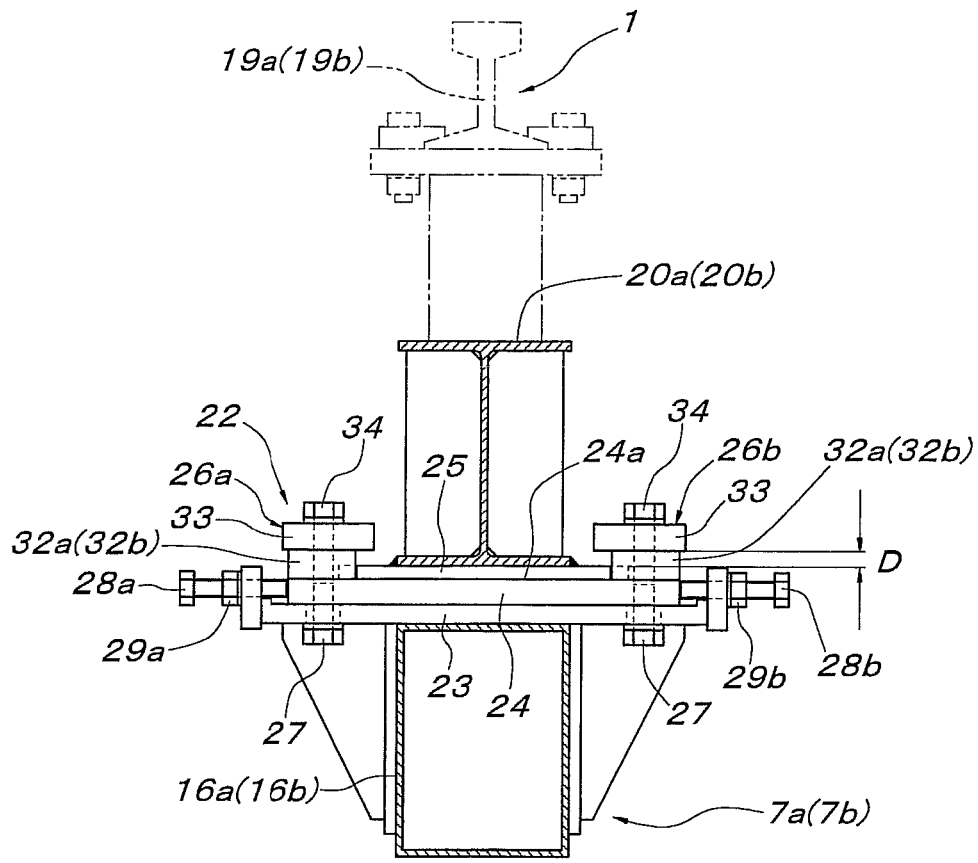
FIG. 4 is a longitudinal sectional side view showing a joining means between an elevating body and a guide rail.
Figure 5:
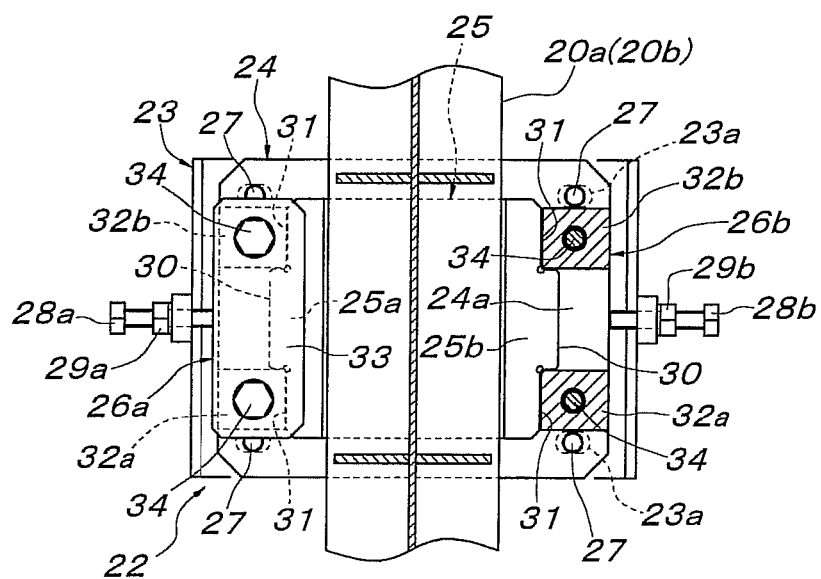
FIG. 5 is a cross-sectional plan view of the same joining means.
Figure 6:
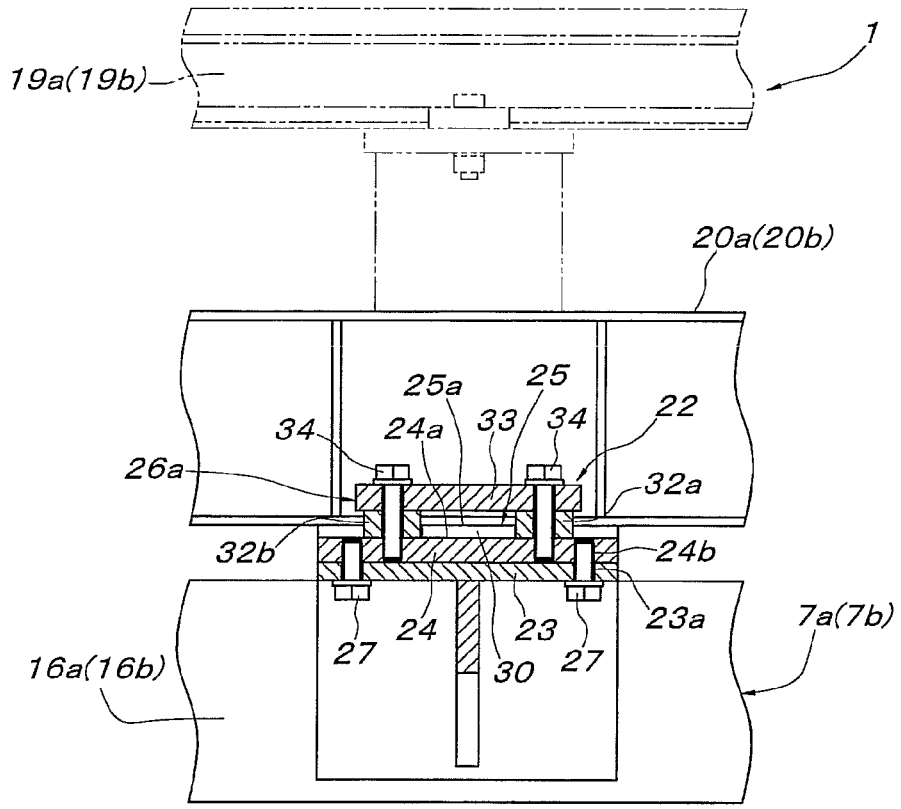
FIG. 6 is a longitudinal sectional front view of the same joining means.
Figure 7:
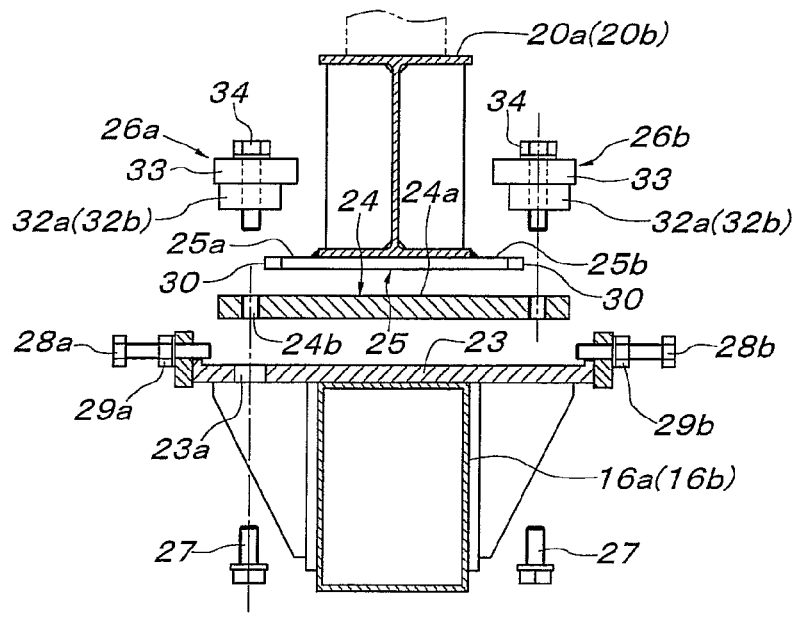
FIG. 7 is an exploded longitudinal sectional plan view of the same joining means.

Describing in a more detailed structure, as shown in FIG. 2 and FIG. 3, the horizontal arms 7a and 7b of the elevating body 4 include a pair of side frame members 15 parallel in the rail longitudinal direction of the elevating guide rail 1 and a plurality of joint members 16 which join integrally both side frames 15, and the inner ends of both side frames 15 are axially supported on the side surfaces near the lower end of the elevating main body 6a or 6b by support shafts 17 parallel to the rail longitudinal direction of the elevating guide rail 1, and cantilevered sideways at right angles with respect to the elevating main body 6a or 6b by a pair of hanging support rods 18 interposed diagonally at the upper recessed corners between both side frames 15 and the elevating main body 6a or 6b.

The elevating guide rail 1 includes a pair of left and right rail main bodies 19a and 19b, a pair of left and right rail support members 20a and 20b supporting the rail main bodies 19a and 19b, respectively, a plurality of joint members 21 which integrally join the rail support members 20a and 20b to each other. The pair of left and right rail support members 20a and 20b of the elevating guide rail 1 are joined onto the horizontal arms 7a and 7b on the elevating body 4 side via joining means 22.

The respective joining means 22 are disposed at a total of four positions between two joint members 16a and 16b positioned just below the pair of rail support members 20a and 20b of the elevating guide rail 1 so as to overlap these among the plurality of joint members 16 of the horizontal arms 7a and 7b of the elevating body 4, and the pair of rail support members 20a and 20b. These four joining means 22 have the same structure, and describing details thereof with reference to FIG. 4 through FIG. 8, each joining means 22 includes a horizontal support plate 23 fixed on the joint member 16a or 16b of the horizontal arm 7a or 7b of the elevating body 4 so as to project to both left and right sides from this joint member 16a or 16b, a slide plate 24 placed and fixed on this horizontal support plate 23, a contact plate 25 which is fixed on the bottom surface of either of the pair of rail support members 20a and 20b of the elevating guide rail 1 so as to project to both left and right sides from this rail support member 20a or 20b and placed on the horizontal support surface 24a that is the upper surface of the slide plate 24, and a pair of holding members 26a and 26b attached onto the slide plate 24 so as to cover a part of both left and right sides of the contact plate 25.

The slide plate 24 is fixed onto the horizontal support plate 23 by a plurality of fastening bolts 27 which are screwed and fastened in screw holes 24b made in the slide plate 24 so as to perforate upward the horizontal support plate 23 from the lower side of the horizontal support plate 23, and the through holes on the horizontal support plate 23 side which the fastening bolts 27 penetrate through are shaped into slots 23a long in the left and right direction orthogonal to the rail longitudinal direction of the elevating guide rail 1, and in the range of these slots 23a, the slide plate 24 can be adjusted in position in the left and right direction orthogonal to the rail longitudinal direction of the elevating guide rail 1. To make it easy to adjust the position of the slide plate 24, on both left and right sides of the horizontal support plate 23, a pair of left and right press bolts 28a and 28b which press left and right sides of the slide plate 24 with their tip ends, and lock nuts 29a and 29b for preventing loosening of the press bolts 28 are provided.

The contact plate 25 is slightly smaller in size than the slide plate 24, and portions projecting to the left and right from the rail support members 20a and 20b are formed into convex shapes in a plan view having rectangular projections 30 at their centers to form convex projecting plate portions 25a and 25b. The pair of holding members 26a and 26b are disposed corresponding to the convex projecting plate portions 25a and 25b of the contact plate 25 placed at the center of the horizontal support surface 24a on the slide plate 24, and include a pair of seat portions 32a and 32b rectangular in a plan view which fit recessed corners 31 formed on both sides of the projections 30 of the convex projecting plate portions 25a and 25b, and top plates 33 which are fixed onto the seat portions 32a and 32b and integrate these, and are attached to the slide plate 24 with two attaching bolts 34 penetrating through the seat portions 32a and 32b. The seat portions 32a and 32b are formed of plate members with thicknesses being a predetermined size thicker than the plate thickness of the contact plate 25, and therefore, the top plates 33 cover the projections 30 of the convex projecting plate portions 25a and 25b of the contact plate 25 fitting between the seat portions 32a and 32b while leaving a predetermined distance D (see FIG. 4) above the projections 30. Therefore, the contact plate 25 on the elevating guide rail 1 side supported on the horizontal support surface 24a of each joining means 22 of the horizontal arm 7a or 7b side of the elevating body 4, that is, the elevating guide rail 1 supported horizontally on the horizontal arm 7a or 7b of the elevating body 4 is restricted in the horizontal position by the seat portions 32a and 32b of the holding members 26a and 26b fixed on the slide plate 24 on the horizontal arm 7a or 7b side and cannot move horizontally, however, it is supported so as to be allowed to move vertically in the range of the distance D below the top plates 33 of the holding members 26a and 26b.

Figure 8:
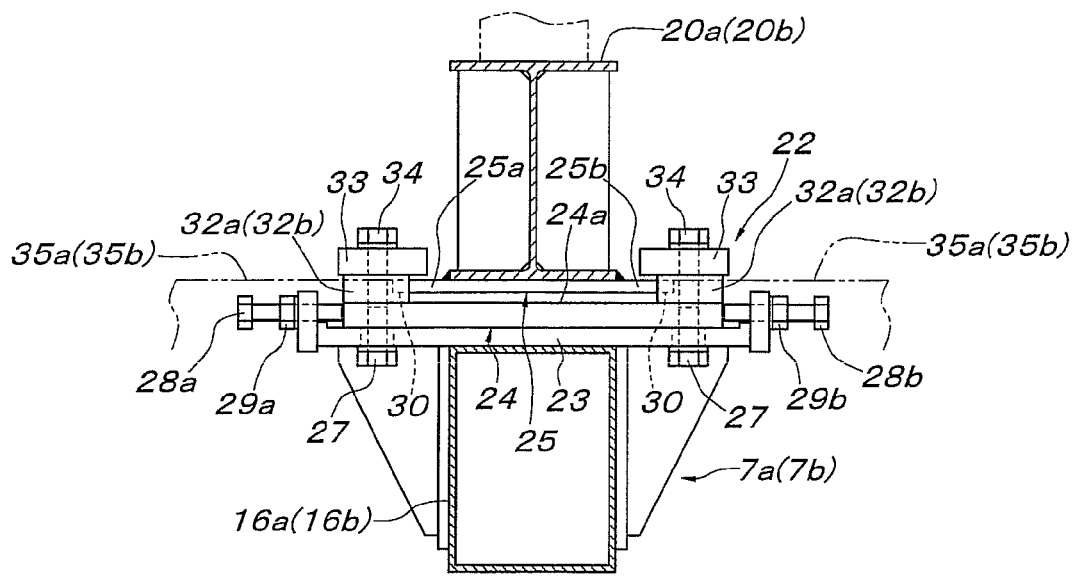
FIG. 8 is a longitudinal sectional side view showing a state that the elevating body side and the elevating guide rail side relatively move vertically in the same joining means.

In the above-described constitution, the guide wheels 12a and 12b are driven to rotate by the driving motor 10 of the elevating drive means 8 via the transmission shaft 14, and the elevating body 4 suspended by the suspending chains 9a and 9b is moved vertically along the columnar supports 5a and 5b, whereby the elevating guide rail 1 supported horizontally by the elevating body 4 can be elevated between a lifted position at which it is connected to the upper fixed guide rails 3 shown by the solid lines in FIG. 1 and a lowered position at which it is connected to the lower fixed guide rails 2 shown by the imaginary lines. Receiving members 35a and 35b which receive this elevating guide rail 1, specifically, positions near both ends in the longitudinal direction of the rail support members 20a and 20b when the elevating guide rail 1 lowers to the lowered position at which it is connected to the lower fixed guide rails 2, are provided on the floor. The lower limit position of the elevating body 4 is set to a position as shown in FIG. 8 to which the elevating body 4 (horizontal arms 7a and 7b) relatively further lowers with respect to the elevating guide rail 1 in the range of vertical play of the contact plate 25 of each joining means 22, that is, in the range of the distance D from the state that the rail support members 20a and 20b of elevating guide rail 1 are received by the receiving members 35a and 35b and the ends of the rail main bodies 19a and 19b are connected to the rail main bodies 2a and 2b of the lower fixed guide rails 2.

In other words, when the elevating body 4 lowers over the range (the range of the distance D) of vertical play of the contact plate 25 of each joining means 22, the top plates 33 of the holding members 26a and 26b in each joining means 22 are received by the upper surfaces of the convex projecting plate portions 25a and 25b of the contact plate 25 and the lowering of the elevating body 4 is blocked, and thereafter, the path portions suspending the elevating body 4 of the suspending chains 9a and 9b of the elevating drive means 8 loosen, and an undesired state that the whole load on the elevating body 4 side is supported by the top plates 33 of the holding members 26a and 26b of each joining means 22 occurs, and to the contrary, if the lower limit position of the elevating body 4 is excessively high, and when the elevating body stops, the contact plate 25 on the elevating guide rail 1 side does not relatively float up from the slide plate 24 (horizontal support surface 24a) on the elevating body 4 side in each joining means 22, the elevating guide rail 1 stops before being received by the receiving members 35a and 35b, and an undesired state that the rail main bodies 19a and 19b of the elevating guide rail 1 stop at positions deviating upward from the rail main bodies 2a and 2b of the lower fixed guide rail 2, so that the lower limit position of the elevating body 4 is set at the above-described level at which these undesired states can be avoided.

In the elevating guide rail 1 thus received by the receiving members 35a and 35b on the floor side just before the elevating body 4 reaches the lower limit position, the rail main bodies 19a and 19b are connected without a level difference to the rail main bodies 2a and 2b of the lower fixed guide rails 2, so that a traveling body for transportation (conveyance carriage) C shown by the imaginary lines can be safely and smoothly transferred between the elevating guide rail 1 and the lower fixed guide rail 2.

When the elevating guide rail 1 is received by the receiving members 35a and 35b, in the vertical direction, the rail main bodies 19a and 19b are connected without a level difference to the rail main bodies 2a ad 2b of the lower fixed guide rail 2 as described above, however, when a position deviation in the left and right horizontal direction occurs between the elevating guide rail 1 and the lower fixed guide rail 2, in each joining means 22, the pair of left and right press bolts 28a and 28b are pressed-in and out in a state that the fastening bolts 27 and the lock nuts 29a and 29b are loosened to adjust the position of the slide plate 24 in the left and right direction, whereby the position deviation in the left and right horizontal direction between the rail main bodies 19a and 19b and the lower fixed guide rail 2 is corrected, and thereafter, the fastening bolts 27 and the lock nuts 29a and 29b are fastened, and accordingly, the slide plate 24 (elevating guide rail 1) can be fixed at a predetermined position on the horizontal support plate 23, thereby correcting the position deviation in the left and right horizontal direction between the elevating guide rail 1 and the lower side fixed guide rail 2.

Figure 9A:
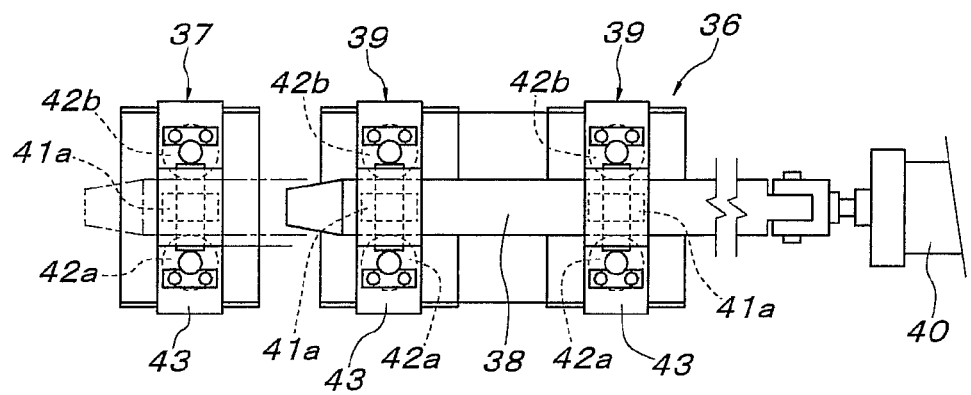
FIG. 9A is a partially cut-away plan view showing an example of a positioning means between the elevating guide rail and an upper fixed guide rail.
Figure 9B:
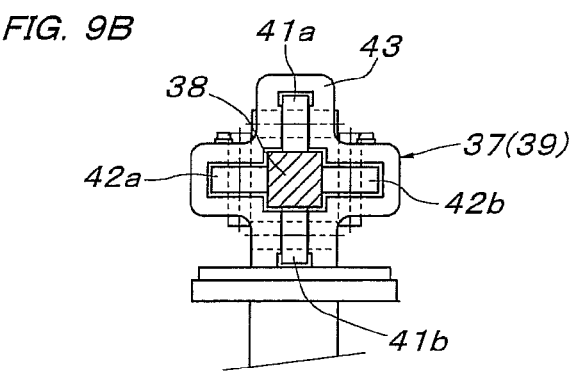
FIG. 9B is a longitudinal sectional side view of the same positioning means.

Next, an example of means for positioning the elevating guide rail 1 lifted by the elevating body 4 at a position at which the elevating guide rail is connected without a level difference to the upper fixed guide rails 3 will be described. The positioning means 36 shown by the imaginary lines in FIG. 1B and FIG. 3 includes receiving portions 37 provided on the ends of the rail main bodies 19a and 19b of the elevating guide rail 1, and advancing and withdrawing pins 38 which are provided on the ends of the rail main bodies 3a and 3b of the upper fixed guide rail 3 and can fit the receiving portions 37 in a disengageable manner horizontally. As shown in FIG. 9, the advancing and withdrawing pin 38 is formed into a square shaft having a tapered tip end, and is supported movably in a direction parallel to each rail main body 3a or 3b by two front and rear supports 39 provided on the upper fixed guide rail 3 side, and is driven to advance and withdraw by a cylinder unit 40 provided on the upper fixed guide rail 3 side. The receiving portion 37 and the supports 39 have the same structure, and are constituted so that a pair of upper and lower horizontal shaft rollers 41a and 41b which roll in contact with the upper and lower surfaces, respectively, of the advancing and withdrawing pin 38 and a pair of left and right vertical shaft rollers 42a and 42b which roll in contact with the left and right surfaces, respectively, of the advancing and withdrawing pin 38 are axially supported within a cross-shaped enclosure frame 43. The enclosure frame 43 of the receiving portions 37 can be attached to the rail support members 20a and 20b of the elevating guide rail 1, and the enclosure frame 43 of the supports 39 can be attached to the rail support members supporting the rail main bodies 3a and 3b of the upper fixed guide rail 3.

In the positioning means 36 constituted as described above, the receiving portion 36 and the supports 39 are arranged so that the rail main body 19a or 19b of the elevating guide rail 1 are connected without a level difference to the rail main body 3a or 3b of the upper fixed guide rail 3 when the advancing and withdrawing pin 38 is made to advance by the cylinder unit 40, the tip end thereof is made to enter the inside of the receiving portion 37 on the elevating guide rail 1 side, the pair of upper and lower horizontal shaft rollers 41a and 41b of the receiving portion 37 side are in contact with the upper and lower surfaces of this advancing and withdrawing pin 38, and the pair of left and right vertical shaft rollers 42a and 42b of the receiving portion 37 side are in contact with the left and right surfaces of the advancing and withdrawing pin 38.

On the other hand, the advancing and withdrawing pin 38 which enters the inside of the receiving portion 37 has a tapered tip end, and the space which the advancing and withdrawing pin 38 enters on the receiving portion 37 side that the tapered tip end of the advancing and withdrawing pin 38 enters consists of four rollers 41a through 42b, and the entrance of this advancing and withdrawing pin entering space is opened in a trumpet shape by the peripheral surfaces of the rollers 41a through 42b, so that even if the position of the receiving portion 37 (position of the elevating guide rail 1) slightly deviates vertically, the position of the receiving portion 37 (position of the elevating guide rail 1) is automatically corrected in the vertical direction by the upper and lower surfaces of the advancing and withdrawing pin 38 by pushing the tapered tip end of the advancing and withdrawing pin 38 into the advancing and withdrawing pin entering space surrounded by the four rollers 41a through 42b as long as the position is within the range in which the tapered tip end of the advancing and withdrawing pin 38 is guided into the advancing and withdrawing pin entering space surrounded by peripheral surfaces of the four rollers 41a through 42b.

Therefore, the positioning means is constituted so that the position of the receiving portion 37 can be corrected upward by pushing the advancing and withdrawing pin 38 into the receiving portion 37, that is, the maximum position upward deviation is prevented from becoming larger than the distance D of each joining means 22, and the upper limit stop position of the elevating body 4 is set at a level deviating downward within the range of the distance D of each joining means 22 from the regular positioning level at which the advancing and withdrawing pin entering space of the receiving portion 37 and the advancing and withdrawing pin 38 face each other concentrically in each positioning means 36, whereby after the elevating body 4 is stopped at the upper limit position, by advancing the advancing and withdrawing pin 38 of each positioning means 36 and pushing each advancing and withdrawing pin 38 into the receiving portion 37 on the elevating guide rail 1 side stopping at the level slightly lower than the regular level, by each advancing and withdrawing pin 38, the elevating guide rail 1 is pushed up via the receiving portion 37 of each positioning means 36 with respect to the elevating body 4 (horizontal arm 7a or 7b) within the range of the distance D in each joining means 22, whereby the level of the elevating guide rail 1 can be corrected into a state that the rail main bodies 19a and 19b of the elevating guide rail 1 are connected without a level difference to the rail main bodies 3a and 3b of the upper fixed guide rail 3. Therefore, between the elevating guide rail 1 and the upper fixed guide rail 3, the traveling body for transportation (conveyance carriage) C shown by the imaginary lines can be safely and smoothly transferred.

Although not shown in the figures, when the traveling body for transportation (conveyance carriage) C is not a self-propelled type, the horizontal arms 7a and 7b of the elevating body 4 can be provided with drive means for drawing the traveling body for transportation (conveyance carriage) C onto the elevating guide rail 1 from the lower fixed guide rail 2 or the upper fixed guide rail 3, and on the end of the elevating guide rail 1 and the ends of the lower fixed guide rail 2 and the upper fixed guide rail 3, stoppers which freely open and close to prevent the traveling body for transportation (conveyance carriage) C from dropping from the guide rails when these guide rails are not connected can be provided. It is also possible that these stoppers are automatically opened and closed by using vertical relative movements of the guide rails when the guide rails are connected to each other.

In the figures, the lower fixed guide rail 2 and the upper fixed guide rail 3 are disposed on both front and rear sides of the elevating guide rail 1, however, it is also allowed that these lower fixed guide rail 2 and upper fixed guide rail 3 are connected to either of the front and rear sides of elevating guide rail 1. Further, when the elevating guide rail 1 is short, it is also allowed that an elevating body which elevates along one columnar support supports the central portion in the longitudinal direction of the elevating guide rail. As a matter of course, the elevating body may elevate by being guided by columnar supports stood on both left and right sides of the elevating path of the elevating guide rail 1.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

What is claimed is:

1. An upper and lower path switching device for a traveling body for transportation, comprising: an elevating body supported movably vertically on columnar supports along an elevating path of the elevating body between a lower limit and an upper limit of the elevating path; a drive means which drives and elevates the elevating body; an elevating guide rail supported horizontally on the elevating body; upper fixed guide rails which are connected to the elevating guide rail at an elevated position of the elevating body; lower fixed guide rails which are connected to the elevating guide rail at a lowered position of the elevating body, and arranged so as to transfer a traveling body for transportation from either one of the upper fixed guide rail or the lower fixed guide rail onto the other via the elevating guide rail, wherein the elevating guide rail is supported movably vertically in a predetermined range with respect to the elevating body, and receiving members are provided which receive the elevating guide rail at a level at which it is connected to the lower fixed guide rails before the elevating body reaches the lower limit of the elevating path of the elevating body, and after the elevating guide rail is received by the receiving members, the elevating body is operable to be lowered to the lower limit of the elevating path independently of the elevating guide rail.

2. The upper and lower path switching device for a traveling body for transportation according to claim 1, wherein the elevating body is provided with elevating main bodies supported movably vertically on columnar supports and horizontal arms projecting sideways horizontally from the elevating main bodies, the elevating guide rail is provided with a contact plate projecting horizontally at a position to be placed on the horizontal arm, and on the horizontal arm, a horizontal support surface which supports the contact plate and holding members which are covered on the contact plate so as to restrict a horizontal position of the contact plate and allow only vertical movements thereof in a predetermined range, are provided.

3. The upper and lower path switching device for a traveling body for transportation according to claim 2, wherein the contact plate is provided so as to project to both sides on the bottom surface of a rail support member supporting a rail main body of the elevating guide rail, and both projecting plate portions are formed into convex shapes having projections projecting horizontally at the centers thereof, and the holding members comprise four seat portions which fit recessed corners on both sides of the projections of both convex projecting plate portions and restrict the horizontal position of the contact plate, and top plates laid between the two seat portions so as to cover both convex projecting plate portions at a distance above the plate portions.

4. The upper and lower path switching device for a traveling body for transportation according to claim 2, wherein the horizontal support surface on the side of the horizontal arm on which the contact plate is supported is formed by the upper surface of a slide plate attached onto the horizontal arm so as to be adjustable in position in a lateral direction orthogonal to the rail longitudinal direction of the elevating guide rail, and onto this slide plate, the holding members are attached.

5. The upper and lower path switching device for a traveling body for transportation according to claim 1, wherein positioning means for positioning the elevating guide rail at the level at which it is connected to the upper fixed guide rails by pushing-up the elevating guide rail after the elevating body reaches the upper limit of the elevating path is provided, and the positioning means includes a receiving portion provided on the elevating guide rail side and an advancing and withdrawing pin which is provided on the upper fixed guide rail side and can fit the receiving portion in a horizontally disengageable manner, where the advancing and withdrawing pin is formed into a square shaft having a tapered tip end, and onto the receiving portion, a pair of upper and lower horizontal shaft rollers which roll in contact with at least the upper and lower surfaces of the advancing and withdrawing pin is axially supported.

* * * * *